(12) United States Patent
Ansley et al.

(10) Patent No.: US 9,485,527 B2
(45) Date of Patent: Nov. 1, 2016

(54) HYBRID RESOURCE MANAGEMENT SYSTEM AND METHOD

(71) Applicant: ARRIS Enterprises, Inc., Suwanee, GA (US)

(72) Inventors: Carol J. Ansley, Johns Creek, GA (US); Andrew J. B. Poole, Louisville, CO (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/259,638

(22) Filed: Apr. 23, 2014

(65) Prior Publication Data

US 2015/0312644 A1 Oct. 29, 2015

(51) Int. Cl.

| | | |
|---|---|---|
| *H04N 7/173* | (2011.01) | |
| *H04N 21/24* | (2011.01) | |
| *H04N 21/61* | (2011.01) | |
| *H04N 21/239* | (2011.01) | |
| *H04N 21/658* | (2011.01) | |
| *H04N 21/2665* | (2011.01) | |
| *H04N 21/222* | (2011.01) | |
| *H04N 21/258* | (2011.01) | |

(52) U.S. Cl.
CPC ...... *H04N 21/2402* (2013.01); *H04N 21/2221* (2013.01); *H04N 21/2393* (2013.01); *H04N 21/25833* (2013.01); *H04N 21/2665* (2013.01); *H04N 21/6118* (2013.01); *H04N 21/6125* (2013.01); *H04N 21/6581* (2013.01); *H04N 21/6582* (2013.01)

(58) Field of Classification Search
CPC .......... H04N 21/47202; H04N 7/17318; H04N 7/17336
USPC ............ 725/93–96, 111–118; 709/217–232
See application file for complete search history.

(56) References Cited

U.S. PATENT DOCUMENTS

| | | | |
|---|---|---|---|
| 6,438,123 B1* | 8/2002 | Chapman | 370/351 |
| 7,596,799 B2* | 9/2009 | Chen | H04N 5/44591 725/100 |
| 8,352,979 B2 | 1/2013 | Medford et al. | |
| 8,379,660 B2 | 2/2013 | Ansley | |
| 8,418,214 B2 | 4/2013 | Schiller et al. | |
| 8,468,572 B2* | 6/2013 | Liu | H04L 12/2801 725/94 |
| 9,313,138 B2* | 4/2016 | Sun | H04L 47/38 |
| 9,313,248 B2* | 4/2016 | Epstein | G06F 21/10 |
| 2003/0007200 A1* | 1/2003 | McIntyre | G06Q 20/387 358/527 |
| 2006/0094440 A1* | 5/2006 | Meier | H04L 12/189 455/453 |
| 2007/0204311 A1* | 8/2007 | Hasek | H04N 7/17318 725/91 |
| 2008/0144621 A1* | 6/2008 | Huang | H04L 65/4076 370/390 |
| 2008/0155592 A1* | 6/2008 | Walter | H04N 7/16 725/34 |
| 2009/0296737 A1* | 12/2009 | Arye | H04L 45/00 370/465 |
| 2011/0162027 A1 | 6/2011 | Chen et al. | |
| 2012/0023535 A1 | 1/2012 | Brooks | |
| 2013/0013704 A1* | 1/2013 | Pope et al. | 709/206 |
| 2015/0312644 A1* | 10/2015 | Ansley | H04N 21/6125 725/95 |

* cited by examiner

*Primary Examiner* — Annan Shang
(74) *Attorney, Agent, or Firm* — Lori Anne D. Swanson

(57) ABSTRACT

A method of optimizing the delivery of content over a content delivery network to client devices in accordance with optimization rules is provided. Requests for allocation and release of content delivery resources over a content delivery network are monitored, and the processing capabilities of client devices receiving content over the content delivery network are determined. Network resources are re-allocated based on optimization rules and the processing capabilities, and the client devices are directed to use re-allocated resources for reception of content. Apparatus and client devices for performing the method are also disclosed.

20 Claims, 7 Drawing Sheets

HYBRID RESOURCE MANAGEMENT SYSTEM AND METHOD

BACKGROUND

Broadband network operators, such as multiple system operators (MSOs), distribute and deliver services and content, such as video, audio, and multimedia content, to subscribers or end-users. For example, a broadband cable network MSO may utilize resources for transmitting digital video broadcasts in standard definition or high definition so-called legacy formats, or Internet Protocol Television (IPTV) formats to provide linear and non-linear services, and the like. Existing network infrastructure typically has a finite amount of bandwidth to provide these services as well as other over-the-top or like services. As new methods of video transmission, such as LTE broadcast or IPTV, enter into operators' networks, resources need to be allocated efficiently between new capabilities and legacy methods.

With respect to delivering services, delivery can be accomplished in a variety of manners, such as in a broadcast mode, a switched mode, an on-demand mode, or the like. In broadcast mode, all channels, programs, or linear (i.e., scheduled) content are simultaneously broadcast to all subscribers in a pre-defined service group. In a switched mode, only channels, programs, or linear (i.e., scheduled) content having active viewers may be broadcast. In on-demand mode, non-linear content may be provided upon specific viewer request by way of switched unicast or multicast delivery.

At the customer premises or location, a population of differently-configured client devices may be operatively connected in some form to receive content over the network. For example, client devices may include legacy set top boxes (STBs) or like customer premises equipment (i.e., without IP or IPTV capabilities), IP-enabled STBs or like customer premises equipment, IPTV STBs or like customer premises equipment, computers, laptops, tablets, smartphones and the like. The capabilities of the population of client devices may vary greatly with respect to IPTV-enablement, encoding/decoding, encrypting/decrypting, packaging, transcoding and the like.

In particular, the distribution of video services using IPTV protocols and transmission methods has increased over time and this trend is expected to continue to the extent that IPTV may become the standard in the future. While IPTV distribution can be accomplished using existing infrastructure of most network operators, such existing infrastructure may not have necessarily been designed for such use. Further, new IPTV transmission methods, such as LTE broadcast, might not even travel over the current wired networks.

In another example, a typical hybrid fiber coaxial (HFC) plant of a cable network operator may accommodate a pre-determined finite number of Quadrature Amplitude Modulation (QAM) channels which can be used to carry legacy digital video (non-IPTV) or digital data (IPTV) content streams. As MSOs move to increased IPTV distribution and support greater numbers of new and different client devices with different capabilities, existing non-IPTV customer premise equipment in millions of homes must still be accommodated and, when new IPTV equipment is deployed in the network, it must be able to offer at least the same level of services offered to non-IPTV legacy customers as well as the additional IPTV services.

During the above referenced expected transition, an approach to accomplish this may be to deliver IPTV content, such as linear content, over existing infrastructure that also simulcasts or duplicates legacy (non-IPTV) linear content streams. Another approach may be to deliver given content as an IPTV content stream over the network only when needed by unicast or multicast to specific IPTV subscribers. Both of these approaches inherently may require significant network bandwidth, possibly beyond that of existing infrastructure, particularly as IPTV subscriptions increase.

BRIEF DESCRIPTION OF THE DRAWINGS

Various features of the embodiments described in the following detailed description can be more fully appreciated when considered with reference to the accompanying figures, wherein the same numbers refer to the same elements.

FIG. 2 is a diagram demonstrating process steps performed by a resource manager in communication with a client device and resources in accordance with an embodiment. FIGS. 2A and 2B are collectively referred to herein as FIG. 2.

FIG. 3 is a diagram demonstrating process steps performed by a resource manager in communication with a two different client devices in accordance with an embodiment. FIGS. 3A and 3B are collectively referred to herein as FIG. 3.

FIG. 4 is a diagram demonstrating process steps performed by a resource manager in communication with a two different client devices in accordance with an embodiment. FIGS. 4A and 4B are collectively referred to herein as FIG. 4.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
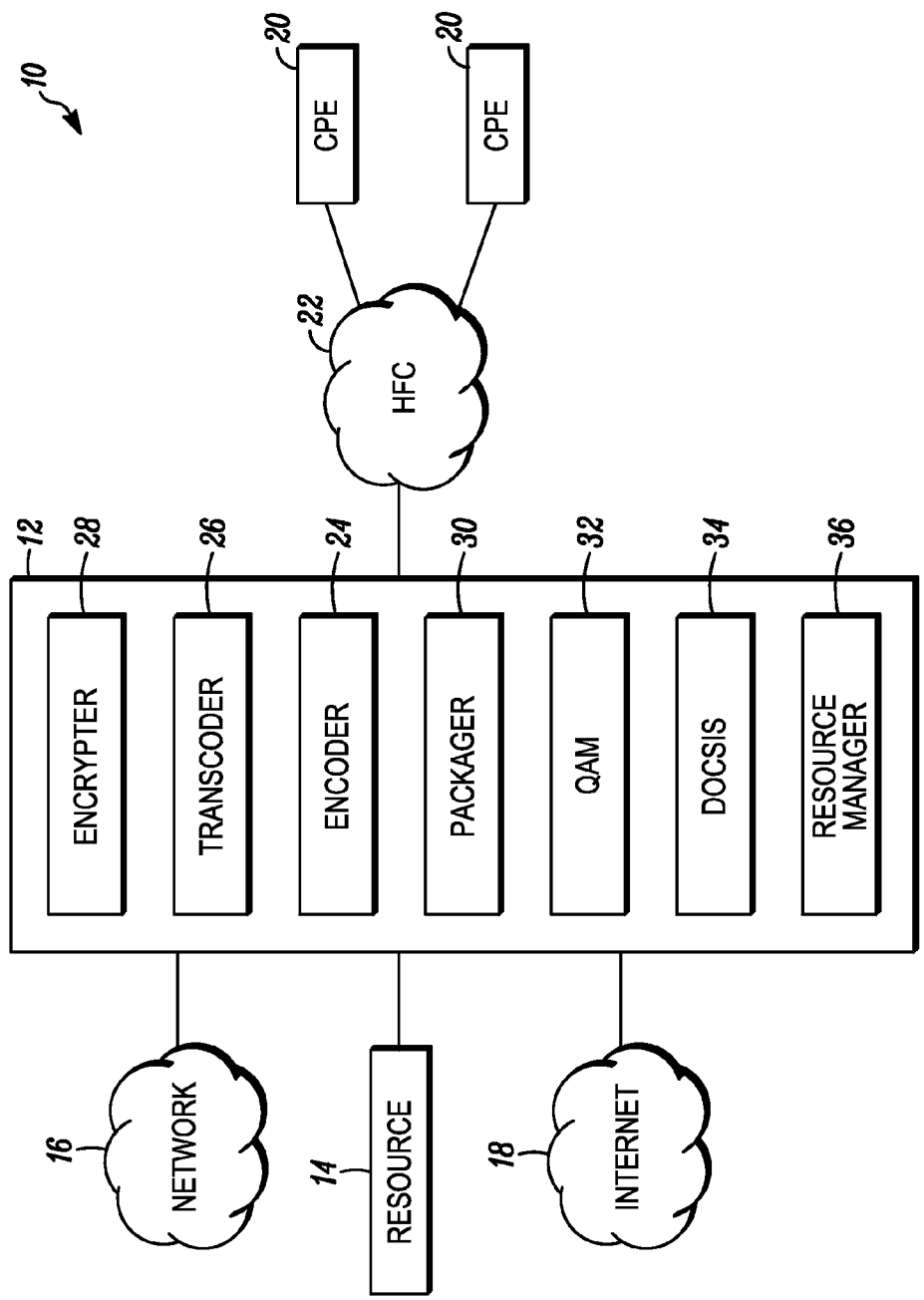
FIG. 1 is a simplified diagram of a content delivery network in accordance with an embodiment.

FIG. 1 is a simplified diagram of a content distribution network 10 in accordance to an embodiment. The headend 12 is controlled by a broadband service provider, such as an MSO or telco, and is utilized to obtain content from various content resources 14, networks 16, the Internet 18, and the like and to deliver the content to customer premises equipment (CPE) 20 via network infrastructure 22, such as a HFC network. The content obtained and distributed may be linear content (i.e., scheduled broadcast content), non-linear content, or the like and may be in the form of IPTV content, legacy (non-IPTV) content, or the like.

The CPEs 20 are typically located at the subscriber sites and may include any electronic equipment connected to or in communication with the HFC network 22. The CPE 20 can be client devices or end-user devices such as STBs, legacy STBs (without IP or IPTV capabilities), IP-enabled STBs, IPTV STBs, televisions, gateways, modems, routers, gaming modules, computers, laptop computers, tablets, smartphones, and the like. Typically, CPEs 20 are arranged in service groups, which may include all the CPEs 20 within a given neighborhood, geographic area, or the like. A CPE 20 may handle content only in one or more of the QAM or legacy formats, the CPE 20 may handle content only in one or more of the IPTV formats, or it may be able to make use of content in either QAM or IPTV formats.

The headend 12 may include or have access to encoding resources 24, transcoding resources 26, encrypting resources 28, packaging resources 30, edge access mediation resources such as QAM resources 32, or DOCSIS resources 34, and like resources enabling the headend 12 to deliver a stream in a given format over a broadband access network 22. As opposed to a headend 12, the above equipment may be provided at a hub, central office or any other facility providing wired or wireless network access.

According to an embodiment, the headend 12 may also include a resource manager 36 for controlling and deciding which resources are to be used for any given content stream. For instance, the resource manager 36 may determine where the content originates and in which form the content may be delivered, for instance, as an IPTV content stream or a legacy (non-IPTV) content stream. In addition, the resource manager 36 may make certain decisions relative to the type of encoding, transcoding, encryption, packaging, and/or modulation used to deliver the content.

The resource manager 36 may be influenced by information such as content distribution rules in accordance with contractual commitments or business rules in accordance with product marketing decisions. For example, the resource manager 36 may base any of the above decisions on optimization rules that are directed to providing requested content at least cost, with minimum of network bandwidth, or with minimum stream count.

With respect to linear content and the behavior typically expected with large numbers of viewers sharing a common network delivery path, it has been found that subscribers tend to aggregate to the most popular programs scheduled at any given time. For instance, it is estimated that about 80% of subscribers are watching about 20 scheduled programs at any given time. The remaining 20% of viewers are distributed across the rest of the content, with some content almost always unwatched for extended periods of time.

Low popularity content as described above is often referred to as "long tail" content since it represents a large number of channels watched by only a small number of viewers, the long tail of a probability distribution function modeling viewer engagement. This type of content is particularly suited for switched digital video (SDV) delivery in which only the content currently being tuned into by a subscriber within a service group is broadcast to the service group. Linear content that is not currently being tuned into by a subscriber is temporarily switched off and is not delivered until later requested. This permits efficient use of available bandwidth while enabling the number of different contents offered for delivery to be expanded.

Thus, according to one embodiment, the resource manager 36 functions as a bandwidth management controller. In this capacity, the resource manager 36 is configured to make intelligent decisions with respect to bandwidth, for instance, relative to delivering the content as legacy QAM content streams (non-IPTV) or as an IPTV content stream. For example, the same content delivered in the form of an IPTV content stream may require only about half of the bandwidth required if delivered in the form of a legacy content stream.

Thus, by configuring the resource manager 36 to select the appropriate delivery format of each content stream requested by CPE 20, the additional bandwidth needs of subscribers whose devices can accept IPTV or QAM formatted content may be minimized to the "long-tail" of infrequently viewed content while legacy broadcast content streams may be used for popular programming, at least with networks or during periods of time in which bandwidth usage is near or at capacity.

Figure 2A:
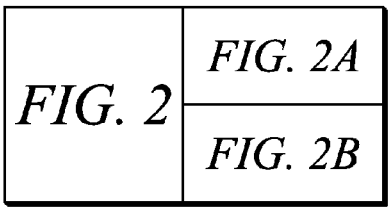
FIG. 2A depicts a first portion of the process steps of FIG. 2.
Figure 2A:
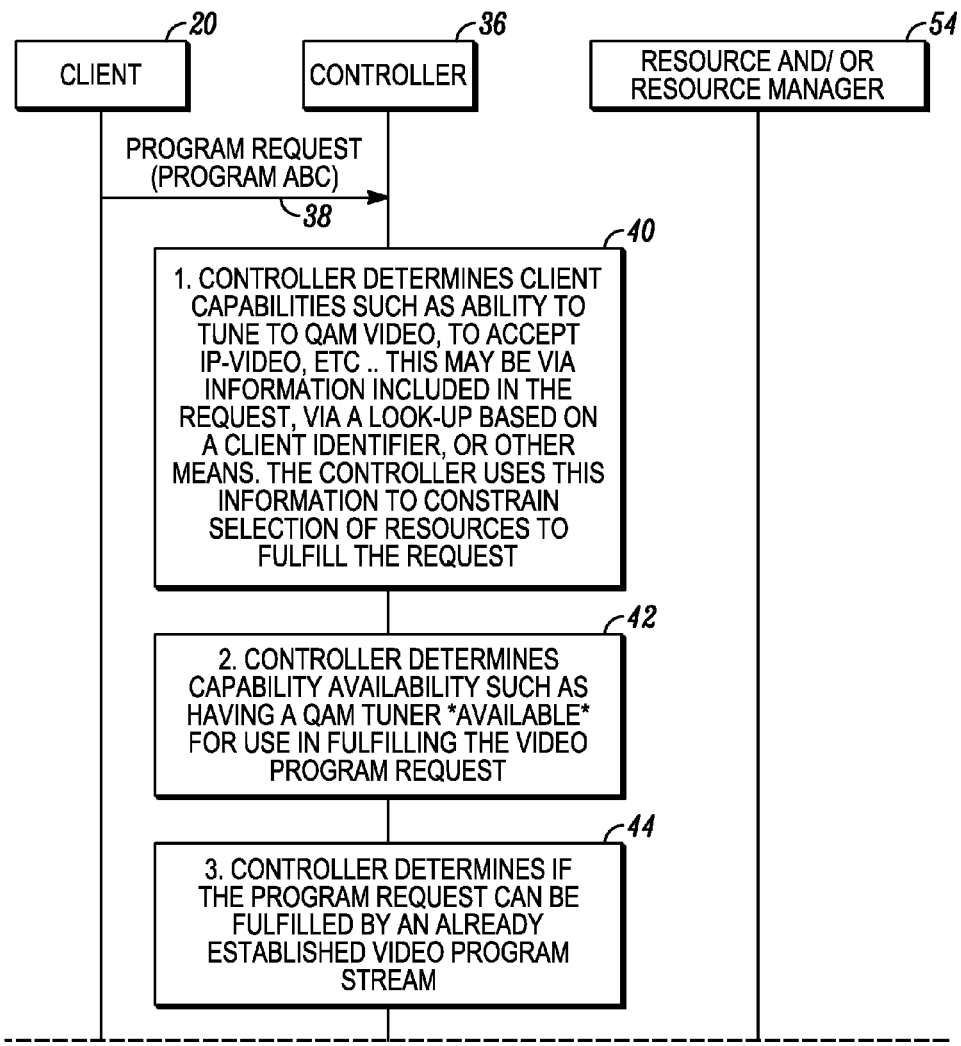
Figure 2B:
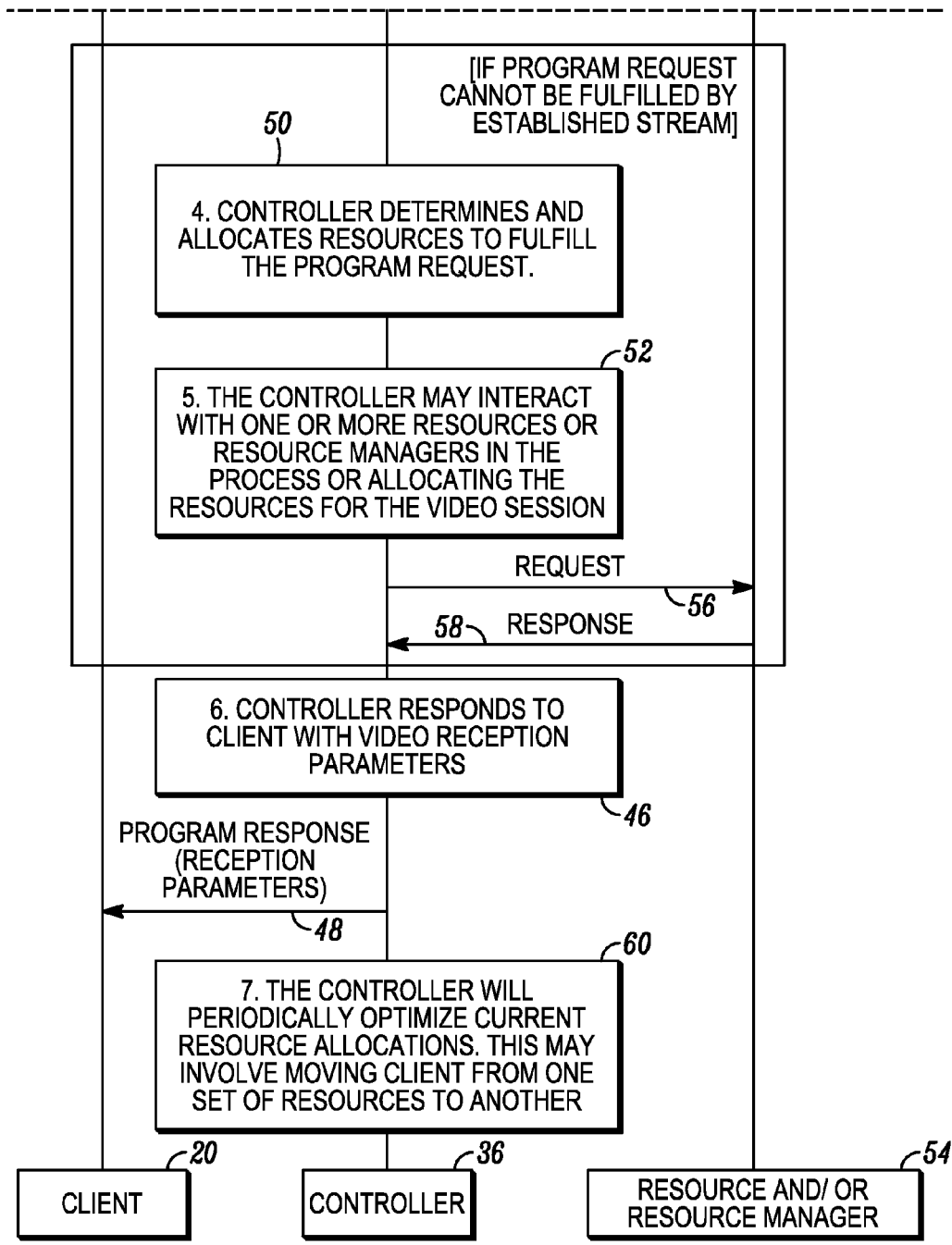
FIG. 2B represents the continued diagram of the process steps of FIG. 2.

By way of example, FIG. 2 provides contemplated processing logic for the resource manager 36. In FIG. 2, a requesting CPE or client device 20 communicates a program request 38 for particular linear content (ABC) via an upstream communication across the access network 22 to the resource manager 36. In response, the resource manager 36 in step 40 determines the capabilities of the particular requesting client device 20. For instance, the resource manager 36 determines whether the requesting client device can receive and process an IPTV content stream or a legacy (non-IPTV) content stream and the capabilities with respect to decoding, decrypting and the like. Such determinations may be made from information provided with the request 38 or obtained from a database or the like by the resource manager 36 based on a client identifier or the like.

In steps 42 and 44, the resource manager 36 determines the resources available at the headend 12 or otherwise for fulfilling the request 38 and determines whether the program request 38 may be fulfilled by a content stream already established with respect to another client device in the service group. If an appropriate content stream for the requesting client device 20 is already established and being delivered over the network, the resource manager 36 may proceed to step 46 and respond to the client device 20 with reception parameters. See program response 48 in FIG. 2. The requesting client device 20 can then tune into the established content stream using the provided reception parameters.

Alternatively, if the program requested is not already available in an appropriate format for the requesting client device 20 and cannot be fulfilled with an already established content stream, the resource manager 36 must determine the best format to fulfill the request. Thus, in step 50, the resource manager 36 determines and allocates the appropriate, least cost, and most efficient set of resources to fulfill the program request 38. The set of resources may include any of available broadcast data bandwidth such as QAM video channels or LTE broadcast channels, available narrowcast data bandwidth such as DOCSIS, DSL or LTE resources, encryption resources, packaging resources, encoding resources, transcoding resources, content resources, and the like.

In step 52, the resource manager 36 interacts with one or more of the above stated resources or other resource managers 54 to allocate the resources to establish a new video session. See request 56 and response 58 in FIG. 2. If the resources are being managed by a different manager, then the resource manager 36 must request the other resource manager to provide the needed resources. Here, the resource manager 36 might be tasked with initiating the stream directly, or the other resource manager might initiate the stream. As a result, a video content stream is established and delivered over the appropriate wired or wireless network and the video reception parameters are passed to the client device 20 to fulfill the request 38.

The resource manager 36 is configured to periodically review and optimize resource allocations. This may require switching to the use of different resources and type of resources to fulfill previous requests of client devices and may require moving a client device from an established content stream to a different formatted content stream for the same content. See step 60 in FIG. 2. This is also described in greater detail with respect to examples provided below.

Figure 3A:
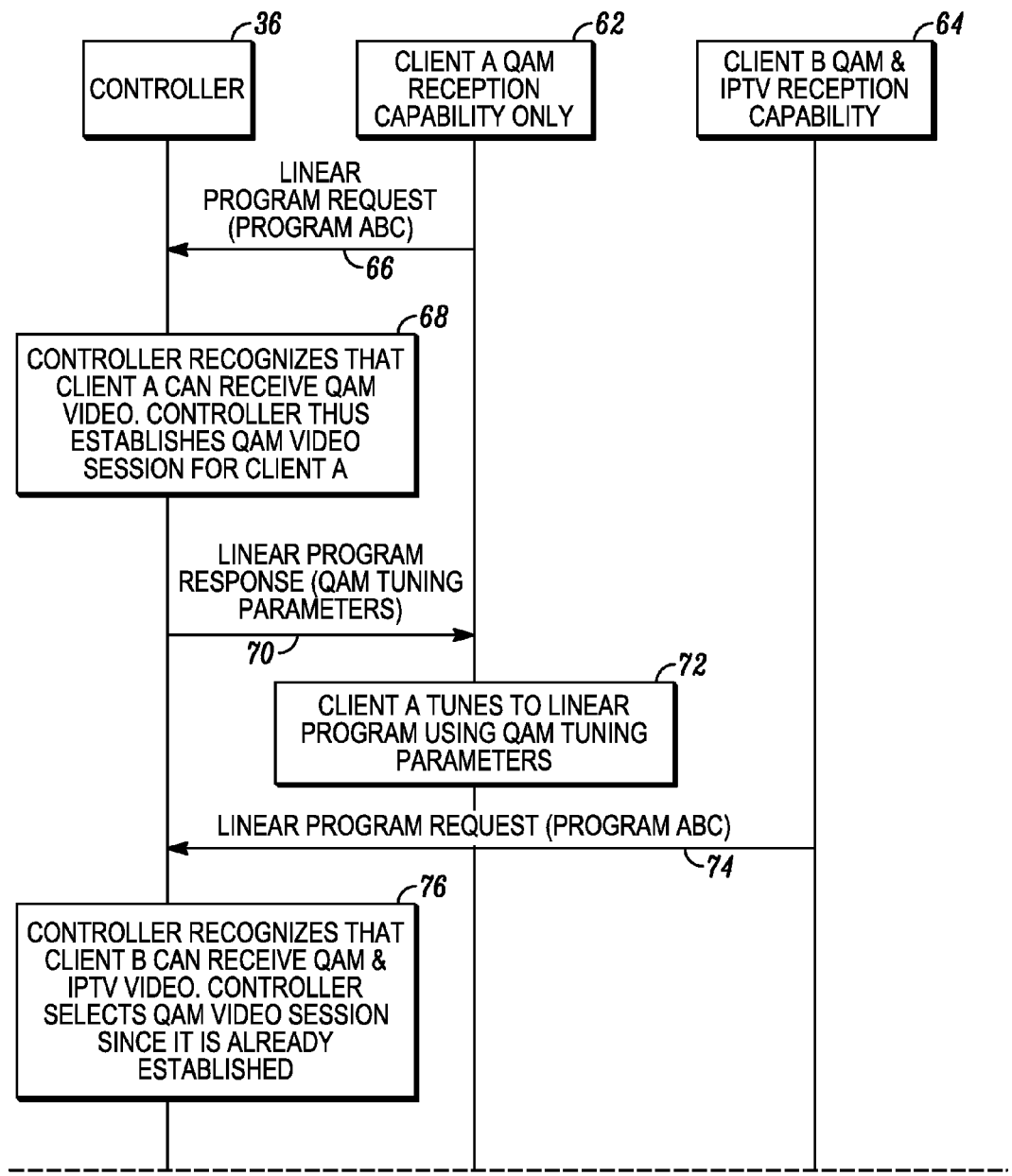
FIG. 3A depicts a first portion of the process steps of FIG. 3.
Figure 3B:
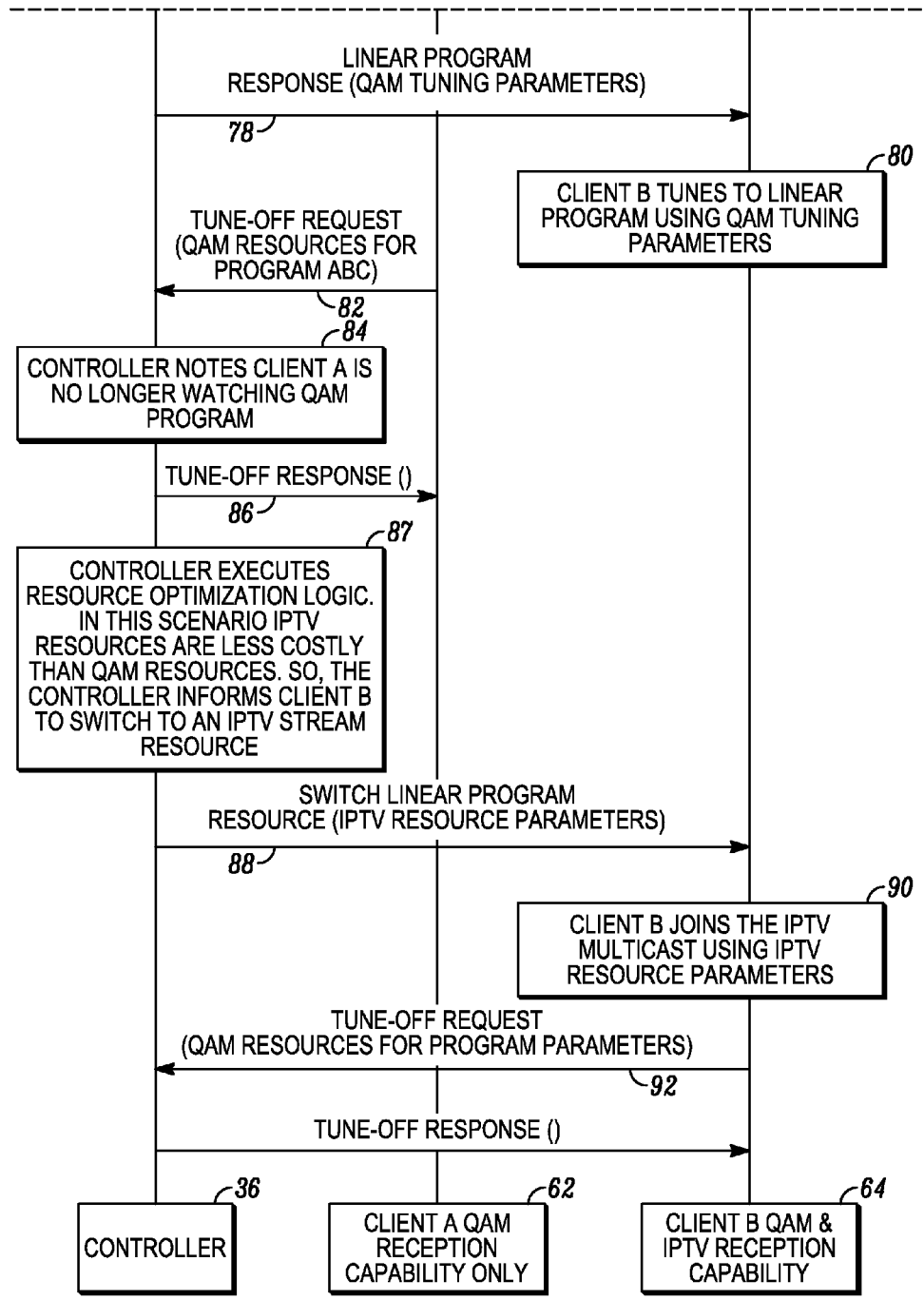
FIG. 3B represents the continued diagram of the process steps of FIG. 3.

FIG. 3 provides a further example in which two different client devices 62 and 64 interact with the resource manager 36 with respect to linear program requests for a particular program (i.e., program ABC as referenced in FIG. 3). In this scenario, client device 62 (i.e., client A as referenced in FIG. 3) is a legacy device and can only process legacy (non-IPTV) QAM content streams and does not have the capability of processing IPTV content streams. In contrast, the client device 64 (i.e., client B as referenced in FIG. 3) is able to receive and process both legacy (non-IPTV) QAM content streams and IPTV content streams.

Client device 62 (client A) makes a request for a scheduled program that is subject to being provided in a switched mode (i.e., a switched digital video (SDV) mode). See request 66. At a time preceding the request, the program had been switched off and is not currently being delivered within the service group. The resource manager 36 recognizes that the requesting client device 62 only has capabilities for receiving and processing legacy (non-IPTV) QAM video and therefore initiates a QAM assignment for the requested program and communicates such information to the requesting client device 62. See step 68 and response 70 providing tuning parameters. This assignment and communication process could use SDV protocols. Client device 62 (client A) acquires the desired program using the information from the resource manager 36. See step 72.

At a later point in time while client device 62 (client A) remains tuned to the program (ABC), the client device 64 (client B), which is an IPTV-capable client, sends a request for the same program (ABC) to the resource manager 36. See request 74.

In step 76, the resource manager 36 determines that client device 64 can receive and process legacy (non-IPTV) and IPTV content streams. Based on this information and the recognition that that the program (ABC) is already being delivered over the network in a legacy (non-IPTV) format from the prior request 66 of client device 62, the resource manager 36 responds to client device 64 (client B) with tuning parameters of the already established legacy (non-IPTV) content stream. See response 78 and step 80 during which the second requesting client device 64 (client B) tunes to the same content stream to which client device 62 (client A) is tuned. Thus, bandwidth is not required for simultaneously providing the same content in two different content stream formats.

At a point later in time, client device 62 notifies the resource manager 36 that it no longer requires access to that program (ABC). See tune-off request 82. The resource manager 36 acknowledges the notification in step 84 and tune-off response 86. Assuming that there is no other client device besides client device 64 tuned into the program (ABC) at this time, the resource manager 36 can execute resource estimation logic. Assuming in this scenario that IPTV resources are less costly and more efficient from a bandwidth standpoint than legacy (non-IPTV) resources, the resource manager 36 instructs client device 64 (client B) to switch to a newly established IPTV stream for the program. See step 87 and switch response 88. Any switchover requires the client device 64 to carefully transition between frames of the video content within the different streams such that the move is not perceptible by the viewer. As a result, client device 64 joins an IPTV multicast or unicast service using the IPTV resource parameters provided by the resource manager 36, see step 90, and sends a tune-off request 92 with respect to the legacy (non-IPTV) stream when it is no longer required.

Thus, according to this system and method, when the resource manager 36 determines that it is more efficient to move client device 64 to a different stream format (for instance, between IPTV and non-IPTV streams or between wireless or wired streams), it directs client device 64 to use the alternative stream for access to the content. After client device 64 successfully transitions to the new stream, client device 64 notifies the resource manager 36 that the unused assignment can now be reclaimed by the network. Thus the unused stream is switched off the network.

Figure 4A:
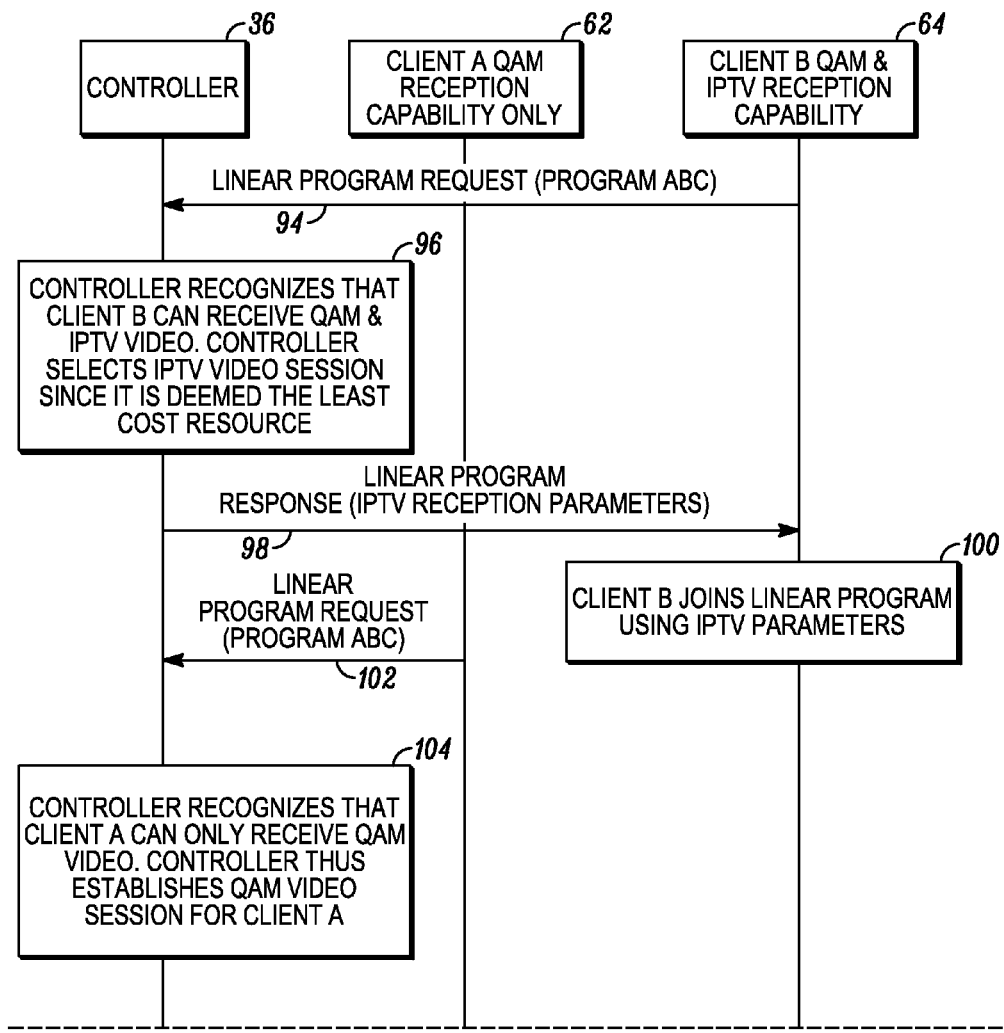
FIG. 4A depicts a first portion of the process steps of FIG. 4.
Figure 4B:
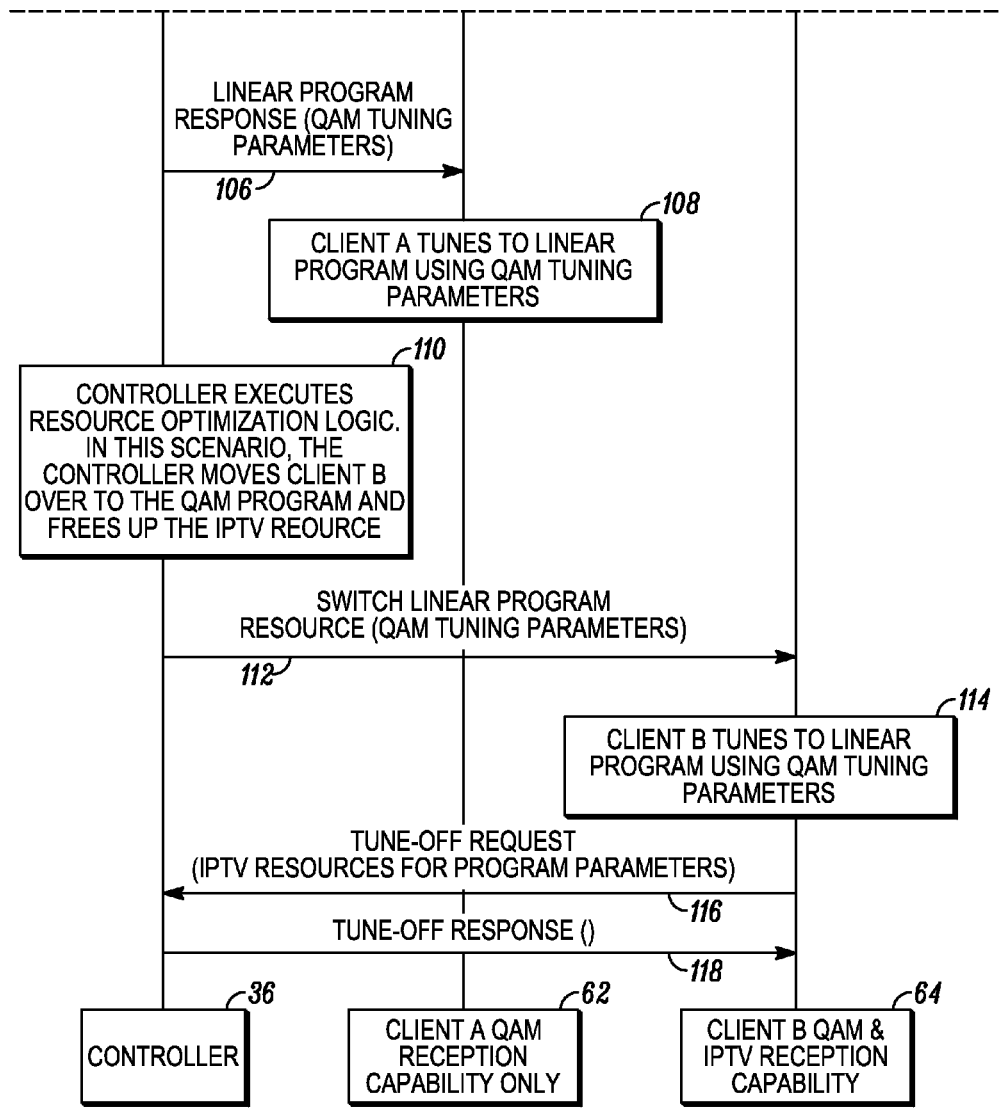
FIG. 4B represents the continued diagram of the process steps of FIG. 4.

FIG. 4 provides a different scenario and example in which the IPTV client, client device 64 (client B), moves first to select/tune into a program (ABC). Thus, client device 64 makes a request 94 and the resource manager 36 recognizes in step 96 that client device 64 has capabilities for receiving and processing a legacy wired (non-IPTV) stream and a wireless IPTV content stream, such as one using LTE Broadcast. In this example, the resource manager 36 selects establishment of a wireless IPTV stream since it is deemed the least costly resource, particularly in terms of wired bandwidth as well as other factors. Thus, resource manager 36 transmits a response 98 to client device 64 with wireless IPTV reception parameters and, in step 100, client device 64 joins the wireless IPTV multicast.

When the client device 62 (client A) thereafter sends a request 102 for the same linear program (ABC), the resource manager 36 recognizes that client device 62 can only receive and process a legacy (non-IPTV) stream and does not have capabilities for processing a wireless IPTV content stream. Thus, resource manager 36 establishes a legacy (non-IPTV) stream in step 104 and sends a response 106 to client device 62 with appropriate tuning parameters. Client device 62 then tunes into the program (ABC) in step 108.

The resource manager 36 executes resource optimization logic and determines that client device 64 (client B) can be moved from the wireless IPTV stream to the legacy (non-IPTV) stream currently tuned into by client device 62. See step 110. Thus, resource manager 36 directs client device 64 to switch from the previously established wireless IPTV stream to the newly established wired legacy (non-IPTV) stream for purposes of conserving resources. See switch instruction 112 provided with the new tuning parameters. As a result, client device 64 smoothly switches to the new non-IPTV stream in step 114 and forwards a tune-off request 116 for the previously established IPTV stream. Thereafter, resource manager 36 ceases transmission of the wireless IPTV stream to conserve resources and notifies client device 64 with a tune-off response 118.

While the above examples primarily focus on switching between IPTV and legacy (non-IPTV) linear content streams, this is only provided by way of example and any resource can be modified and optimized by the resource manager 36. For example, depending on the type of requesting client device and its capabilities, switching between streams having different encodings, encryptions, transcoding, packaging or the like can result. For instance, if the client device is a gaming module or a tablet of a particular manufacturer, a particular type of encoding or encryption may be required. Also other protocols or stream formats can be used beyond that of IPTV and legacy content streams.

Thus, any resource that alters the form of the content stream or its delivery method can be considered by the resource manager 36 upon its execution of resource optimization logic.

The content delivery network to which client devices are in connection with the headend and the access network over which content streams may be delivered may be any type of network. The content delivery network and the access network may be the same network (i.e., a HFC network) or the content delivery network may be a network that is different than that of the access network (i.e., a wired network and a wireless network). Examples of different networks and forms of content streams may include QAM over HFC, QAM over fiber to the home, DOCSIS over HFC, DOCSIS over RFoG (Radio Frequency over Glass), LTE (Long Term Evolution) broadcast, wireless network such as a 4G (fourth generation) wireless network, or the like.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

In addition, the above referenced client devices, electronic processing units, components, modules, equipment, boxes, resources, servers, and the like for carrying out the above methods can physically be provided on a circuit board or within another electronic device and can include various processors, microprocessors, controllers, chips, disk drives, and the like. It will be apparent to one of ordinary skill in the art that the processors, controllers, tuners, modules, managers, and other components may be implemented as electronic components, software, hardware or a combination of hardware and software. In addition, the term "set top box" generally refers to any device that can be connected to the network for receiving video and/or data signals and does not require the device to be in the form of a "box" or placed on top of a television set.

One of ordinary skill in the art appreciates that various modifications and changes can be made without departing from the scope of these embodiments as defined in the appended claims.

We claim:

1. A method of optimizing content delivery over a network to client devices within a service group in accordance with optimization rules, the method comprising:
   monitoring requests for allocation and release of content delivery resources over a content delivery network, wherein content is deliverable over the content delivery network via both Internet Protocol Television (IPTV) and non-IPTV in one or more respective content streams;
   determining a current use of IPTV and non-IPTV to deliver content to client devices within the service group;
   responsive to at least one of:
      a) a request for delivery of a first content to a first one of said client devices within the service group, the delivery via one of said IPTV or non-IPTV, or
      b) a tune off request requesting a release of a first content currently delivered via one of said IPTV or non-IPTV to a first one of said client devices,
   determining whether to re-allocate content delivery resources within the service group by comparing at least two of:
      a utilization of content delivery resources needed for a delivery of an existing stream of first or second content via one of said IPTV or non-IPTV to at least one of: the first one of said client devices or at least one other client device within the service group,
      IPTV and non-IPTV capabilities of the first one of said client devices and at least one other client device within the service group, or
      available resources needed to establish a new stream of the content via an alternate one of said IPTV or non-IPTV for delivery to the at least one of the first one of said client devices or the at least one other client device within the service group; and
   directing any affected client devices determined for use of re-allocated resources for reception of content via said IPTV or non-IPTV according to said comparison.

2. A method according to claim 1, wherein the optimization rules include at least one of least cost optimization rules, minimum network bandwidth optimization rules, and minimum stream count optimization rules.

3. A method according to claim 1, wherein the capabilities of client devices include at least one of decryption capabilities, decoding capabilities, network access, and IPTV capabilities.

4. A method according to claim 1, wherein the content delivery resources include at least one of a content resource, another network, the Internet, an encoding resource, a transcoding resource, an encrypting resource, a packaging resource, an edge access mediation resource, a QAM resource, a LTE broadcast resource, and a DOCSIS resource.

5. A method according to claim 1, wherein said monitoring step comprises a step of receiving a request from a requesting client device over the content delivery network for requested content.

6. A method according to claim 5, wherein said directing any affected client devices determined for use of re-allocated resources for the reception of content via said IPTV or non-IPTV comprises:
   selecting between at least a first and second protocol form for delivering the requested content to the requesting client device based on the processing capabilities of the requesting client device determined during said determining whether to re-allocate content delivery resources; and
   delivering the requested content.

7. A method according to claim 6, wherein said directing any affected client devices determined for use of re-allocated resources further comprises of selecting an access network over which the requested content is delivered to the requesting client device.

8. A method according to claim 7, wherein the requested content delivered during said delivering step is of a form selected from a group consisting of QAM over HFC, QAM over fiber to home, DOCSIS over HFC, DOCSIS over RFoG, LTE broadcast over a wireless network, and streamed content over a 4G wireless network.

9. A method according to claim 7, wherein the content delivery network and the access network are the same network.

10. A method according to claim 7, wherein the content delivery network and the access network are different networks.

11. A method according to claim 6, wherein the at least first and second protocol form includes an IPTV content stream and a non-IPTV content stream.

12. A method according to claim 6, wherein said directing any affected client devices determined for use of re-allocated resources further comprises selecting at least one resource selected from a group consisting of encoding resource, transcoding resource, encrypting resource, packaging resource, edge access mediation resource, QAM resource, LTE resource, DOCSIS resource, DSL resource, broadcast data bandwidth, QAM video channel, LTE broadcast channel, and narrowcast data bandwidth based on processing capabilities of a requesting device.

13. A method according to claim 6, wherein said directing step comprises a step of transmitting reception parameters to the requesting client device.

14. A method according to claim 6, further comprising the steps of:
 periodically monitoring whether the requesting client device remains tuned into the requested content, and
 ceasing delivery of the requested content when no client device is determined to be tuned into the requested content as a result of said monitoring step.

15. A method according to claim 6, further comprising the steps of:
 receiving a subsequent request from a later requesting client device for tuning into the requested content while the requesting client device is tuned into the requested content via an established content stream;
 determining processing capabilities of the requesting client device and the later requesting client device;
 if the processing capabilities of the requesting client device and later requesting client device are the same, directing the later requesting client device to the established content stream;
 if the processing capabilities of the requesting client device and later requesting client device are different, re-allocating network resources based on optimization rules and processing capabilities of a requesting device and the later requesting client device; and
 directing the requesting device and the later requesting client device to re-allocated resources for reception of the requested content.

16. A method according to claim 15, further comprising the steps of:
 monitoring when one of the requesting client device and the later requesting client device tunes off of the established content stream of the requested content; and
 re-allocating network resources based on optimization rules and processing capabilities of a remaining one of the requesting client device and the later requesting client device; and
 directing the remaining one of the requesting device and the later requesting client device to re-allocated resources for reception of the requested content.

17. Apparatus for delivering video content over an access network to a population of client devices, comprising:
 a receiver for receiving a request over a content delivery network from a client device for requested video content, wherein the content is deliverable over the content delivery network via both Internet Protocol Television (IPTV) and non-IPTV in one or more respective content streams, the request being at least one of:
  a) a request for delivery of a first content to a first one of said client devices within a service group, the delivery via one of said IPTV or non-IPTV, or
  b) a tune off request requesting a release of a first content currently delivered via one of said IPTV or non-IPTV to a first one of said client devices;
 a controller for determining, responsive to the request, a current use of IPTV and non-IPTV to deliver content to client devices within the service group and, whether to re-allocate content delivery resources within the service group by comparing at least two of:
  a utilization of content delivery resources needed for a delivery of an existing stream of first or second content via one of said IPTV or non-IPTV to at least one of: the first one of said client devices or at least one other client device within the service group,
  IPTV and non-IPTV capabilities of the first one of said client devices and at least one other client device within the service group, or
  available resources needed to establish a new stream of the content via an alternate one of said IPTV or non-IPTV for delivery to the at least one of the first one of said client devices or the at least one other client device within the service group; and
 a transmitter for directing any affected client devices determined for use of re-allocated resources for reception of content via said IPTV or non-IPTV according to said comparison.

18. Apparatus according to claim 17, wherein the optimization rules include at least one of least cost optimization rules, minimum network bandwidth optimization rules, and minimum stream count optimization rules, wherein client device capabilities include at least one of decryption capabilities, decoding capabilities, network access, and IPTV capabilities, and wherein the resources include at least one of a content resource, another network, the Internet, an encoding resource, a transcoding resource, an encrypting resource, a packaging resource, an edge access mediation resource, a QAM resource, a LTE resource, and a DOCSIS resource, DSL resource, broadcast data bandwidth, QAM video channel, LTE broadcast channel, and narrowcast data bandwidth.

19. Apparatus according to claim 17, wherein the requested video content and access network are selected from a group consisting of QAM over HFC, QAM over fiber to home, DOCSIS over HFC, DOCSIS over RFoG, LTE broadcast over wireless network, and streamed content over 4G wireless network.

20. A client device for receiving content distributed over a content delivery network, comprising:
 a transmitter for communicating a request being at least one of:
  a) a request for delivery of a first content to a first one of client devices within a service group, the delivery via one of said Internet Protocol Television (IPTV) or non-IPTV, or
  b) a tune off request requesting a release of a first content currently delivered via one of said IPTV or non-IPTV to a first one of said client devices,
 wherein the content is deliverable over the content delivery network via both Internet Protocol Television (IPTV) and non-IPTV in one or more respective content streams;
 a receiver for receiving reception parameters for the request, wherein the reception parameters are based on an allocation of network resources by the content delivery network and includes instructions to either tune to a newly established content stream via IPTV or non-IPTV for receipt of requested content or to switch from a stream currently delivering content to the client device to a stream already established via IPTV or non-IPTV, the allocation of network resources based on a comparison of at least two of:
  a utilization of content delivery resources needed for a delivery of an existing stream of first or second content via one of said IPTV or non-IPTV to at least one of: the first one of said client devices or at least one other client device within the service group,
  IPTV and non-IPTV capabilities of the first one of said client devices and at least one other client device within the service group, or
  available resources needed to establish a new stream of the content via an alternate one of said IPTV or non-IPTV for delivery to the at least one of the first one of said client devices or the at least one other client device within the service group; and
at least one processor for tuning to the requested content based on received reception parameters, for processing content streams via IPTV and non-IPTV, and for switching between different forms of content streams of requested content.

\* \* \* \* \*